June 28, 1955  K. J. AVERSTEN  2,711,915
CONNECTING DEVICE AND METHOD OF PRODUCTION
Filed March 13, 1950
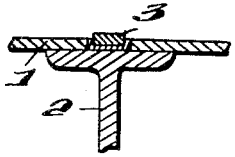
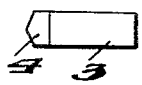
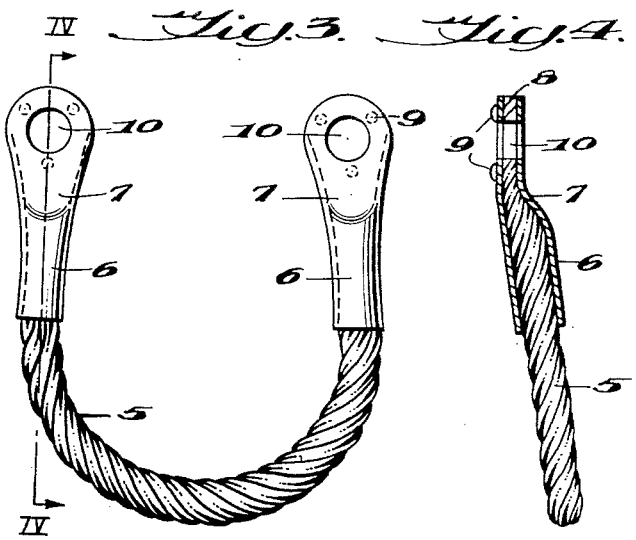
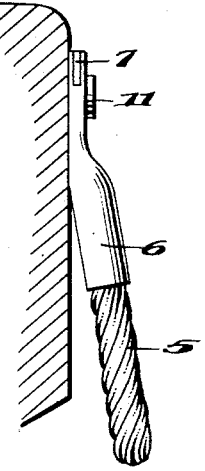
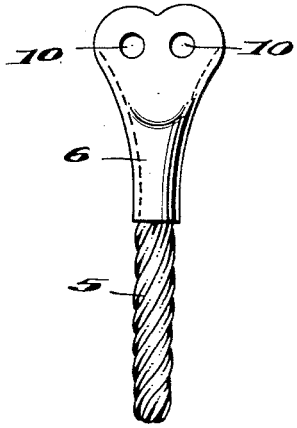
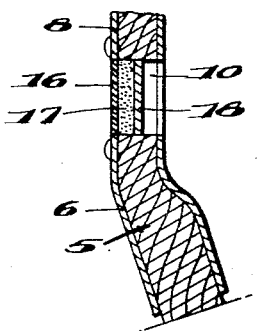
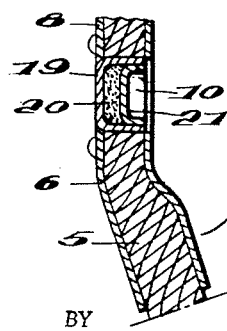
INVENTOR
KARL J. AVERSTEN,
BY Larson and Whiting
ATTORNEYS

United States Patent Office 2,711,915
Patented June 28, 1955

2,711,915

CONNECTING DEVICE AND METHOD OF PRODUCTION

Karl J. Aversten, Lidingo, Sweden, assignor to Svenska Aktiebolaget Gasaccumulator, Lidingo (near Stockholm), Sweden, a corporation of Sweden Application March 13, 1950, Serial No. 149,436

Claims priority, application Sweden November 3, 1949

6 Claims. (Cl. 287—20.2)

The invention refers to connecting devices for connecting metallic members and, more particularly, to such devices adapted to connect a pair of members by means of an electrical conductor. Such connections are used, for instance, for bonding a pair of rails and comprise a conductive wire carrying on each end a contact shoe, which is attached to the rail end, for instance mechanically, by soldering or by manual welding. Soldering has the advantage of not carrying the temperature of the material (the rail for instance) to such excessive heights as to cause melting or hardening of the material, but at the same time requires skillful execution in order to give satisfactory durability.

It is, therefore, the main object of the present invention, to provide in as simple a manner as possible a connection of satisfactory durability, as well as a method of producing such connection.

Further objects of the invention are to enable connections to be made readily, for instance for bonding rails or establishing similar connections between various metal structure elements, such as beams, or metal tubes or between elements, such as power line poles, and ground.

According to the present invention, one of the metallic members to be electrically connected is provided with an opening, in which a metal pin is inserted and pressed against the other member, a firm joint being established through partial melting of the metal pin by means of electric current and subsequent solidifying of the metal. In a connection comprising a wire with a pair of contact shoes or lugs, each of the shoes has an aperture, in which a pin is inserted and then partially melted by the application of current so as to fill the aperture and form upon solidifying a firm connection between the contact shoe and the corresponding metallic member. The aperture may preferably accommodate a suitable flux, inserted between protecting covers. The invention refers to the connection itself as well as its method of production and will be more explicitly set forth in the following description of various embodiments thereof.

In the drawings:

Fig. 1 is a section of a connection according to the invention.

Fig. 2 is an elevation of a metal stud suitable for use with the invention.

Fig. 3 is a view of a connector before being attached.

Fig. 4 is a section along line IV—IV of Fig. 3.

Fig. 5 is a longitudinal section of a stud used with the invention.

Fig. 6 is an elevation of a connection in accordance with Figs. 3 and 4 in its attached position.

Fig. 7 is a partial view of a modified connector.

Figs. 8 and 9 are sections similar to Fig. 4 of further modified connectors drawn on an enlarged scale.

According to the Fig. 1 embodiment of the invention connection is established between a metal plate 1 and a beam 2 by providing an aperture in the plate. The invention uses a metal stud or pin, shown in Fig. 2, comprising a part 3 of steel, brass, copper or some other metal and a part 4 of a solder of suitably low melting point, such as weld bronze or silver solder. The part 3 of the pin is placed in a conductive sleeve, for instance of a welding gun, and the part 4 is inserted in the opening of the plate so as to rest on beam 2, a ferrule of porcelain or other refractory material being preferably placed around the end of the pin. Current is applied to the pin and when it is drawn away somewhat from the beam 2 and out of the opening 1 an arc forms between beam 2 and the end of the pin causing the solder 4 to melt and to flow into the opening and the adjoining interstice between beam and plate. Pin 3 is then pressed downward into the melt in the opening and upon solidification of the solder a firm connection is formed between beam 2, plate 1 and pin 3, the protruding part of which may then be removed in any suitable way.

The whole of the pin may be of the same material, for instance solder, which is only partly melted to provide the melted substance. This, however, requires particular measures to be taken, and it therefore appears preferable to have the pin comprise two materials of different melting points.

In the Figs. 3 and 4 embodiment the connector consists of an electric wire 5 comprising a plurality of strands, such as of copper, a contact shoe or lug 6 being threaded over each of the ends. The ends of the contact shoes, as well as the corresponding parts of the wire, are compressed to form flattened portions 7, whose surfaces 8 are provided each with at least three very low pin-pointshaped protrusions 9 or radial ridges, whereby the surface 8 will always be held at a small distance from the surface to which the shoe is to be attached. The portion 7 is traversed by an aperture 10.

When the contact shoes are to be attached to a metal member, such as a rail, beam, tube or the like a metal pin 11 is inserted in aperture 10. The pin may be of the kind already described but may also be of the type shown in Fig. 5, which shows a metal pin 11 of relatively brittle bronze having a solder portion 12, the free end of which is provided with a recess. This is filled with a flux 13 and covered by a thin lid 14, also of solder. A notch 15 is provided on the pin.

When the contact shoe is to be soldered to a railhead, it is placed, as shown in Fig. 6, with its surface 8 against the railhead. Pin 11 is inserted in a current supplying welding gun and inserted with its end in opening 10 so as to make lid 14 contact the rail. Current is applied for a short interval, the pin is drawn back slightly in order to strike the arc, whereupon lid 14 is melted, as are also flux 13 and solder 12, which flow along surface 8 into the interstices caused by protruding points 9 and also fill opening 10 and flow between the adjacent strands of wire. The melted material, upon solidifying, forms a firm and rigid connection between the rail, the contact shoe surface, the pin and the wire strands as well as the flattened portion 7. One and the same operation thus results in the attaching of the shoe to the rail and in an improved joint between the wire strands and the shoe. The protruding stump of the pin is then broken off at notch 15. However, it is also possible to have the wire strands reach but partly through the contact shoe, to which they may then be attached by a separate soldering process. This method is suitable where the dimensions of conductor 5 are such as to tend to make flattened portion 7 of excessive thickness were the conductor to reach beyond opening 10. Such excessive thickness would make it difficult to attach the shoe to the rail.

The processes of forming the recess in the pin and of positioning the flux and the lid are somewhat laborious. It may therefore be found preferable to provide the contact shoes with a flux in the manner indicated in Figs. 8 and 9. According to Fig. 8 a protective metal cover 16 is pressed into the aperture so as to be flush with surface 8. Flux 17 is then placed in the cavity thus formed and finally a second metal cover 18 is pressed into the aperture below the surface of portion 7, leaving an empty part of the aperture. Covers 16 and 18 are thin sheets of solder and get a positive grip against the wire ends forming the walls of the aperture, thus making the inserted flux be reliably seated during handling or transportation of the connector. For attaching this connector a pin of the Fig. 2 type may be used.

The covers may also be adapted to enclose the flux and to be insertable as a unit in the aperture. As shown in Fig. 9, the covers are bowl-shaped, one enclosing the other with the rims joined, thus tightly enclosing the flux. The bottoms of the bowls may then be thin, so that they are easily melted by the arc when the current is applied, but the rims may be comparatively thick, thus containing a sufficient amount of solder for attaching the pin, which does then not have to be provided with solder.

While different modifications illustrative of the principles of the invention have been disclosed herein by way of example, it will be understood that other specific forms may be employed without departing from the invention, which is to be considered as including all forms of apparatus falling within the scope of the appended claims.

What is claimed is:

1. A connection between two metallic members, in one of which an aperture is provided, comprising a metal pin inserted into said aperture, said pin consisting of two parts with different melting points, the part having the lower melting point forming a soldered joint between the high melting point part of the pin and adjacent surfaces of said metallic members said part having the lower melting point being at least partially disposed within said aperture.

2. A connection according to claim 1, wherein said apertured metallic member is a shoe on an end of an electrical conductor, and the other metallic member is a structural element.

3. A connection according to claim 2, wherein each end of the said conductor is provided with an apertured contact shoe whereby the conductor may be connected between two metallic members.

4. A method of making a connection between two metallic members in one of which an aperture is provided comprising inserting into the said aperture a pin comprising two parts having different melting points, the part of said pin having a lower melting point being adjacent the non-apertured metallic member, striking an electrical arc between that part of the pin having the lower melting point and at least one of the metallic members, and melting that part of the pin having the lower melting point by the heat of said arc to form a soldered connection between that part of the pin having the higher melting point and adjacent surfaces of said members.

5. A method for producing an electrical connection between a metallic member and an electrical conductor member, which comprises providing an aperture in a contact shoe mounted on an end of the conductor member, inserting into said aperture a pin comprising two parts having different melting points, disposing that part of the pin having the lower melting point adjacent the metallic member, striking an electrical arc between that part of the pin having the lower melting point and at least one of said members for a short time interval, and melting the lower melting point part of the pin by the heat of the arc to form a soldered connection between the high melting point part of the pin, adjacent surfaces of said metallic member, said conductor member and said contact shoe.

6. A metallic connection comprising a structural element, a stranded conductor, an apertured contact shoe mounted on said stranded conductor, a pin disposed within the aperture and solder surrounding the pin and at least partially filling said aperture with the solder extending between the strands of the stranded conductor adjacent the aperture and interconnecting said element, conductor, and shoe.

References Cited in the file of this patent

UNITED STATES PATENTS

| Number | Name | Date |
|---|---|---|
| 807,656 | Buchanan | Dec. 19, 1905 |
| 812,900 | Thomas | Feb. 20, 1906 |
| 919,577 | Hill | Apr. 27, 1909 |
| 987,136 | Herrick | Mar. 21, 1911 |
| 1,273,493 | Huber | July 23, 1918 |
| 1,296,651 | Gravell | Mar. 11, 1919 |
| 1,330,800 | Gravell | Feb. 17, 1920 |
| 1,335,428 | Cecelius | Mar. 30, 1920 |
| 1,770,619 | Larsson | July 15, 1930 |
| 1,922,916 | Hermani | Aug. 15, 1933 |
| 1,936,018 | Hodgson | Nov. 21, 1933 |
| 2,074,810 | Sabol | Mar. 23, 1937 |
| 2,403,659 | Nelson | June 25, 1946 |
| 2,455,244 | Evans | Nov. 30, 1948 |
| 2,477,765 | Nelson | Aug. 2, 1949 |

FOREIGN PATENTS

| 30,674 | Switzerland | May 19, 1904 |